Patented Aug. 20, 1946

2,406,217

UNITED STATES PATENT OFFICE 2,406,217

UREA-FORMALDEHYDE REACTION PRODUCTS AND METHODS FOR PRODUCING THE SAME

Mortimer T. Harvey, South Orange, N. J., and Solomon Caplan, New York, N. Y., assignors to Harvel Research Corporation, a corporation of New Jersey No Drawing. Application October 23, 1942, Serial No. 463,132

2 Claims. (Cl. 260—69)

It is an object of the present invention to produce stable aqueous solutions of the urea-formaldehyde type of condensation product.

The present application is a continuation in part of our copending application Ser. No. 294,480, filed September 12, 1939.

When employing thermosetting resins for such purposes as impregnation of porous compositions, as coatings for laminating purposes, for plywood adhesives, and the like, it is usually necessary to utilize solutions of such thermosetting resins. Organic solvents have almost universally been employed for the purpose of obtaining such solutions and in the subsequent operations of converting the thermosetting resin to the infusible state, the organic solvents have been driven off and lost. It would therefore be desirable to use water as the solvent for the thermosetting resin. Such water soluble thermosetting resins have been developed in the nature of urea-formaldehyde condensation products. The great disadvantage of such aqueous solutions of urea-formaldehyde resins has been their short storage life. This objection has long been recognized and various means of overcoming it have been proposed. Thus, for example, in an article published in Industrial and Engineering Chemistry, vol. 31, page 673 (1939), the authors have drawn attention to this failing of aqueous solutions of urea-formaldehyde resins and have proposed the addition of glycols for the purpose of stabilizing the solutions. Owing to the water solubility of the glycols, the finished products, even after conversion to the infusible state, have rather poor water resistance.

It is further an object of the present invention to produce stable aqueous solutions of the urea-formaldehyde type of resin in which the stabilizing agent is itself capable of reacting with the formaldehyde with the production of thermosetting resins having high moisture resistance.

The present invention is based upon the finding that aqueous solutions of formaldehyde condensation products of the monotertiary-alkyl ureas are extremely stable and that mixtures of urea with monotertiary-alkyl ureas, upon reaction with formaldehyde, produce stable aqueous solutions of thermosetting resins. For the method of preparing such tertiary-alkyl ureas, reference is made to our Patent 2,247,495, issued July 1, 1941.

As illustrative examples of the formaldehyde condensation products of the mono-tertiary-alkyl ureas, the following are given:

Example 1

| | | |
|---|---|---|
| Tertiary butyl urea | grams | 116 |
| Formaldehyde solution (37½%) | do | 100 |
| Ammonia solution (26°) | cc | 2.7 |

This mixture was refluxed at boiling temperature for one hour and allowed to cool.

Example 2

| | | |
|---|---|---|
| Tertiary butyl urea | grams | 116 |
| Formaldehyde solution (37½%) | do | 160 |
| Ammonia solution (26°) | cc | 2.7 |

This mixture was refluxed at boiling temperature for one hour and allowed to cool.

Example 3

| | | |
|---|---|---|
| Tertiary butyl urea | grams | 116 |
| Formaldehyde solution (37½%) | do | 240 |
| Ammonia solution (26°) | cc | 2.7 |

This mixture was refluxed at boiling temperature for one hour and allowed to cool.

Examples 4, 5 and 6

The above series of experiments was repeated but instead of 116 grams of tertiary butyl urea, 130 grams of tertiary amyl urea was used.

Examples 7, 8 and 9

Examples 1, 2 and 3 were repeated but with the use of 144 grams of tertiary hexyl urea instead of the 116 grams of tertiary butyl urea.

In all of the above examples the resulting aqueous solutions showed substantially no increase in viscosity after months of storage at room temperature.

Aqueous solutions of the formaldehyde condensation products where then mixed with aqueous solutions of freshly prepared urea-formaldehyde condensation products and it was found that the resulting combined solutions were stabilized to a degree varying with the proportion of the tertiary alkyl urea-formaldehyde condensation product added.

Instead of performing two separate formaldehyde reactions, one with urea and the other with the tertiary alkyl urea and then mixing the products, the more economical procedure would consist in mixing urea with the tertiary alkyl ureas and reacting upon that mixture with formaldehyde. This was tried and found to produce stabilized solutions, the degree of stability again being dependent upon the amount of tertiary alkyl urea added to the urea.

The following examples are presented for illustrative purposes.

Example 10

| | | |
|---|---|---|
| Urea | grams | 60 |
| Formaldehyde solution (37½%) | do | 200 |
| Ammonia solution (26°) | cc | 2.3 |

This mixture was refluxed at boiling temperature for one hour and then permitted to cool. The solution became a non-flowing gel within two weeks of storage at room temperature.

Example 11

| | | |
|---|---|---|
| Urea | grams | 60 |
| Tertiary butyl urea | do | 6 |
| Formaldehyde solution (37½%) | do | 200 |
| Ammonia solution (26°) | cc | 2.3 |

This solution was refluxed at boiling temperature for one hour and permitted to cool. Upon standing at room temperature, it became a non-flowing gel after three weeks.

Example 12

| | | |
|---|---|---|
| Urea | grams | 60 |
| Tertiary amyl urea | do | 6 |
| Formaldehyde solution (37½%) | do | 200 |
| Ammonia solution (26°) | cc | 2.3 |

This mixture was refluxed at boiling temperature for one hour and allowed to cool at room temperature. The solution gelled to a non-flowing state after four weeks at room temperature.

Example 13

| | | |
|---|---|---|
| Urea | grams | 60 |
| Formaldehyde solution (37½%) | do | 275 |
| Ammonia solution (26°) | cc | 3 |

This solution was refluxed for one hour at boiling temperature and allowed to cool. The solution gelled to a non-flowing state after two weeks on standing at room temperature.

Example 14

| | | |
|---|---|---|
| Urea | grams | 60 |
| Formaldehyde solution (37½%) | do | 275 |
| Tertiary butyl urea | do | 18 |
| Ammonia solution (26°) | cc | 3 |

This solution was refluxed for one hour at boiling temperature and allowed to cool. There was no change in viscosity after two months standing at room temperature.

Example 15

| | | |
|---|---|---|
| Urea | grams | 60 |
| Tertiary amyl urea | do | 18 |
| Formaldehyde solution (37½%) | do | 275 |
| Ammonia solution (26°) | cc | 3 |

This solution was refluxed for one hour at boiling temperature and allowed to cool. There was no change in viscosity after two months standing at room temperature.

Example 16

| | | |
|---|---|---|
| Urea | grams | 60 |
| Tertiary hexyl urea | do | 18 |
| Formaldehyde solution (37½%) | do | 275 |
| Ammonia solution (26°) | cc | 3 |

This mixture was refluxed for one hour at boiling temperature and allowed to cool. There was no change in viscosity after two months standing at room temperature.

Example 17

| | | |
|---|---|---|
| Urea | grams | 60 |
| Formaldehyde solution (37½%) | do | 120 |
| Ammonia solution (26°) | cc | 1.4 |

This solution was refluxed at boiling temperature for one hour and allowed to cool. The solution gelled to a non-flowing state within two weeks at room temperature.

Example 18

| | | |
|---|---|---|
| Urea | grams | 60 |
| Tertiary butyl urea | do | 12 |
| Formaldehyde solution (37½%) | do | 120 |
| Ammonia solution (26°) | cc | 1.4 |

This mixture was refluxed for one hour at boiling temperature and allowed to cool. There was only a slight increase in viscosity after two months standing at room temperature.

Example 19

| | | |
|---|---|---|
| Urea | grams | 60 |
| Tertiary amyl urea | do | 12 |
| Formaldehyde solution (37½%) | do | 120 |
| Ammonia solution (26°) | cc | 1.4 |

This mixture was refluxed for one hour at boiling temperature and allowed to cool. There was only a slight increase in viscosity after two months standing at room temperature.

Example 20

| | | |
|---|---|---|
| Urea | grams | 60 |
| Tertiary hexyl urea | do | 12 |
| Formaldehyde solution (37½%) | do | 120 |
| Ammonia solution (26°) | cc | 1.4 |

This mixture was refluxed for one hour at boiling temperature and allowed to cool. There was only a slight increase in viscosity after two months standing at room temperature.

In each of the above examples where mixtures of urea and tertiary urea were employed, the solution of the reaction products, upon acidification and heating at 110° C., produced infusible films which had good water resistance.

In addition to the urea and substituted ureas disclosed in the preceding examples, other substances may be present for the purpose of modifying the properties of the resins obtained and in particular those addition substances which possess the property of reacting with formaldehyde with the production of water soluble condensation products. Such a substance, for example, would be melamine.

As previously stated, the aqueous solution of the reaction products of formaldehyde with the mixtures of urea and tertiary alkyl ureas in the proportions of from ten to thirty per cent of the alkyl urea, based on the weight of the urea, are suitable for the production of water-resistant coatings, laminated products, plywood veneers and the like.

Although the present invention is particularly suited for the production of aqueous solutions of resins, there are occasions when the solutions of these resins in organic solvents are desirable, particularly when it is desired to incorporate such resins into oleoresinous varnishes. For such purpose, the aqueous solutions obtained in accordance with the preceding examples are acidified and then shaken with such solvent as butyl alcohol, amyl alcohol, octyl alcohol or combinations of these. It has been found that the solutions in organic solvents of the joint resins disclosed in this invention are capable of dilution with appreciably greater proportions of mineral solvents, such as the various paint thinners obtained from petroleum, than is possible with similar solution of urea-formaldehyde condensation products prepared in the absence of the tertiary alkyl ureas.

It is also possible to prepare molding powders from the aqueous solutions of the joint resins disclosed in this invention by the addition of absorbent fillers, such as wood flour, to the aqueous solutions of the resins and removal of the water either by application of suction and heat or by means of hot mixing rolls. Acidic agents may be incorporated either with the aqueous solution of the resins or with the final molding powder. It has been found that such molding powders have a longer storage life than is the case with similar molding compositions prepared from the straight urea-formaldehyde condensation products.

Having thus described our invention, what we claim and desire to protect by Letters Patent is:

1. The method of producing a stable aqueous solution of urea-formaldehyde condensation product which comprises heat reacting one to three moles of aqueous formaldehyde with a mixture containing one mole of urea and an amount of a mono-tertiary-alkyl-urea having from four to six carbon atoms in the alkyl group equal to from ten to thirty per cent of the urea.

2. A composition of matter comprising a heat-reaction product of from one to three moles of aqueous formaldehyde with a mixture containing one mole of urea and an amount of a mono-tertiary-alkyl-urea having from four to six carbon atoms in the alkyl group equal to from ten to thirty per cent of the urea.

MORTIMER T. HARVEY.
SOLOMON CAPLAN.